3,810,749
FOAM CROP MATURANT
Donald C. Young, Fullerton, Calif., assignor to Union Oil Company of California, Los Angeles, Calif.
No Drawing. Filed Nov. 26, 1969, Ser. No. 880,417
Int. Cl. A01n 5/00, 9/00
U.S. Cl. 71—70          12 Claims

ABSTRACT OF THE DISCLOSURE

It is disclosed that the maturity of crop-bearing plants can be hastened by treatment of the plant with an aqueous foam having a discontinuous gas phase comprising carbon monoxide or an unsaturated hydrocarbon having from 2 to about 4 carbons at a dosage adequate to provide from about 1 to 300 pounds of the gaseous agent per acre. Typically, the foam composition contains up to 10 volumes of the gaseous agent per volume of liquid and the stability of the foam is sufficient to maintain the agent in contact with the plant for a period from about 5 to about 300 minutes, adequate to permit thorough assimilation of the gaseous agent by the plant and effect the hastening of the maturity of the treated plant.

DESCRIPTION OF THE INVENTION

This invention relates to a method for hastening the maturity of crop-bearing plants and, in particular, relates to the treatment of such plants with carbon monoxide or a volatile unsaturated hydrocarbon.

It is known that various gaseous agents such as ethylene, carbon monoxide, acetylene, etc. hasten the maturity of some plants by inducing or accelerating such growth phenomenon as flowering (differentiation) of asexual plants, fruit ripening, petiole abscission and foliage necrosis. Of these agents, ethylene is known to exhibit the greatest effect. Practical applications of this knowledge have heretofore been limited because of the failure of prior investigators to develop a practical method to envelop plants in an atmosphere rich in the gaseous agent. Accordingly, practical application of the ripening effect has been limited to treatment of harvested fruit by storing the fruit in an atmosphere containing a gaseous hydrocarbon such as ethylene. In vivo uses, by application to plants, has been limited to the use of very large volumes of an aqueous charcoal suspension saturated with ethylene to pineapple to induce differentiation. Some prior investigators have suggested that the plant or crop could be treated by covering the plant with a plastic tent and introducing ethylene under the tent. This technique, while useful for laboratory investigations, has no applicability to commercial or field practice. In fact, this procedure is often impractical even on a laboratory scale since some investigators have performed experiments on excised plant tissue rather than in vivo experiments, thereby incurring the risk that their conclusions may not be applicable to growing, unharvested crops.

The failure of the prior techniques to develop a practical method for the application of gaseous agents to crop-bearing plants is particularly unfortunate since the application of such a gas to a growing, unharvested plant can result in a several-fold, beneficial effect. The application of the gaseous agents to a crop-bearing plant not only hastens uniform ripening of the fruit, but, in addition, promotes the growth of abscission layers of the leaf and fruit petioles. This result is particularly useful for mechanical harvesting which is increasingly being employed to harvest many crop-bearing plants. These mechanical harvesting techniques often destroy the plant and, therefore, require that the majority of the crop ripen or reach harvesting maturity at the same time. Additionally, the efficiency of the mechanical harvesters is improved when the fruit and/or foliage of the plant is more readily severed from the plant as the result of the growth of abscission tissue. The treatment of the plant with a gaseous agent is particualrly advantageous in this regard since such treatment generally hastens both ripening and defoliation.

I have now found that crop bearing plants can be treated with an effective amount of a gaseous agent and the agent can be maintained in contact with the plant for sufficient time to permit its assimilation into the crop bearing plant by the application, to the foliage of the plant or surrounding ground, of the agent as a discontinuous gas phase within an aqueous foam formed from water containing the necessary additives to decrease its surface tension and/or increase its viscosity sufficiently to provide an aqueous foam having a stability from about 0.5 to about 300 minutes or longer.

The gaseous agent which is used to effect the aforementioned plant responses can be carbon monoxide or any volatile unsaturated hydrocarbon, typically those having from 2 to about 4 carbons and including acetylenic and ethylenic hydrocarbons. Examples of these include ethylene, propylene, butene, isobutene, acetylene, methylacetylene, dimethylacetylene, ethylacetylene, etc. Of these, ethylene is the most active and preferred agent.

The gaseous agent can be used alone, in admixture with other gaseous agents, or in admixture with a suitable inert diluent gas such as carbon dioxide, air, nitrogen, a saturated hydrocarbon such as ethane, propane, butane, etc. The inert diluent gas can be used as desired, in amounts comprising from 1/10 to 10/1, preferably from 1/5 to 5/1 parts per part of gaseous treating agent, so as to extend the volume of foam from that obtained in the absence of the inert diluent gas.

Various surface active agents can be added to achieve the lowered surface tension of the water and various water soluble polymers and viscous additives can be added to enhance the viscosity of the water and thereby stabilize the foam. Various mechanical techniques can be employed to produce the foam from the aqueous medium and the hydrocarbon vapor, e.g., a froth can be produced by admixing the aqueous medium and the gaseous agent under high mechanical agitation or, preferably, the gaseous agent can be injected immediately upstream of a mixing nozzle which discharges the aqueous medium and produces a foam.

The various surface active agents which can be added to water to reduce its surface tensions from about 70 dynes per centimeter to a value of about 15 to about 50 dynes per centimeter, preferably to about 20 to about 40 dynes per centimeter, can in general be any of the conventional oil-in-water surfactants. The amount of the surface active agent so added can vary from about 0.1 to about 10, preferably from about 0.5 to 5 weight percent, and such surface activation can be of the cationic, anionic or nonionic type.

Examples of the cationic surfactants include: fatty amines, e.g., dodecylamine, octadecylamine (Armeens, Duomeens of Armour Chemical Company); alkarylamines, e.g., dodecyl aniline, fatty amides such as fatty imidazolines, e.g., undecylimidazoline prepared by condensing lauric acid with ethylene diamine or oleylaminodiethylamine prepared by condensing the oleic acid with asymmetric diethylene diamine (Sapamine CH by Ciba); quaternary alkyl and aryl ammonium salts and hydrates, e.g., cetyltriethyl ammonium cetyl sulfate, dimethylbenzyldodecyl ammonium chloride, etc.; quaternary ammonium bases of fatty amides of disubstituted diamines, e.g., oleyl methylamino ethylene diethylamine methyl sulfate (Sapamine MS by Ciba), oleylbenzylamino ethylene diethylamine hydrochloride (Sapamine ECH by Ciba); fatty derivatives of benzimidazolines such as are prepared by condensation of a fatty acid with orthophenylene-diamine followed by alkylation of the condensate with an alkyl halide to yield an N-alkyl alkylbenzimidazole, e.g., N-methyl N,N'-diethyl heptadecylbenzimidazole; N-fatty alkyl pyridinium compounds, e.g., lauryl pyridinium, octadecyl pyridinium (Fixanol of Imperial Chemical Industries), octadecyl methylene pyridinium acetate, etc.

Examples of useful anionic surface active agents include the following: fatty acid glyceride sulfonates and fatty acid sulfonates, e.g., sulfonated cottonseed oil, sulfonated oleic acid, sulfonated sperm oil, sulfonated tallow, etc.; sulfonated fatty amides, e.g., sulfonated amide of ricinoleic acid (Humectol CA by I. G. Farben); sodium salt of sulfuric ester of oleyl diisobutyl amide (Dismulgen V of I. G. Farben), etc.; sulfonated anilides of fats, e.g., sodium salt of sulfuric ester of oleylethyl anilide (Humectol CX by I. G. Farben), etc.; amides of aminosulfonic acids, e.g., sodium sulfonate of oleylmethyl tauride (Igepon T by I. G. Farben); amides from condensation of fatty acid chlorides with amino acids, e.g., sodium salt of oleyl sarcoside (Medialan A by I. G. Farben); sulfonated aromatic hydrocarbons, e.g., benzene sulfonic, naphthalene sulfonic acids and their ammonium and alkali metal salts, etc.; alkylaryl sulfonates, e.g., dodecylbenzene sulfonates, octadecylbenzene sulfonates, etc.

Illustrative nonionic compounds include the polyethylene oxide condensates with hydrophobic groups having a reactive hydrogen. The hydrophobic group can have from about 10 to 25 carbon atoms and from 2 to about 15 molecular weight of ethylene oxide are commonly condensed per molecular weights of hydrophobic group. The hydrophobic group can be selected from a variety of organic compounds having one or more reactive hydrogens including fatty alkyl or alkenyl alcohol, fatty acids, fatty amines, fatty amide, esterified hexitans or alkyl or alkenyl phenols.

As described, the source of the hydrophilic group is ethylene oxide. Other source materials can be employed, for example, ethylene chlorohydrin, or polyethylene glycol; however, because of its low cost and availability, ethylene oxide is used almost exclusively in the preparation of these materials.

The hydrophobic reactant can comprise an alkyl or alkenyl phenol wherein the alkyl or alkenyl group or groups contain between about 2 and about 16 carbon atoms. Among such compounds are the following: hexyl phenyl, hexenyl phenol, hexadecyl phenol, dodecenyl phenols, tetradecyl phenol, heptenyl cresol, isoamyl cresol, decyl resorcinol, cetenyl resorcinol, isododecyl phenol, decenyl xylenol, etc. Examples of commercially available wetting agents belonging to this class and having a fatty acid constituent and containing ethylene oxide are the following: "Ninosol 100," "Ninosol 200" and "Ninosol 210" of the Alrose Chemical Company and "Nopalcol 4—D" of the Nopeco Chemical Company.

A third class of hydrophobic reactants comprises the alkyl and alkenyl alcohols containing between about 8 and about 22 carbon atoms. Among such alcohols are dodecanol, tridecanol, tetradecanol, pentadecanol, hexadecanol, heptadecanol, octadecanol, decosenol, etc. A commercially available wetting agent of this type and containing ethylene oxide is Brij 30 of The Atlas Powder Company.

A fourth class of the hydrophobic reactants comprises long chain alkyl or alkenyl amines or amides containing between about 8 and about 22 carbon atoms. These compounds contain two reactive hydrogens and the polyethylene oxide units are distributed therebetween. Examples of such compounds are dodecanamide, tridecylamine, tetradecenamide, pentenyl amine, hexadecyl amine, heptadecanamide, octadecyl amine, oleic amide, etc. Examples of commercially available wetting agents in this group containing ethylene oxide are "Ethomide" of The Armour Chemical Company and "Priminox 10" of the Rohm and Haas Chemical Company.

Another class of suitable wetting agents are the reaction products of ethylene oxide with fatty acid partial esters of hexitans. Such compounds are obtained by treating a hexitol, e.g., sorbitol, manitol, dulcitol, etc.; with a dehydrating agent to form the corresponding hexitan, i.e., sorbitan, mannitan, dulcitan, etc. The hexitan is then partially esterified with a long chain fatty acid, having between about 8 and about 22 carbon atoms, such as dodecanoic acid, pentadecanoic acid, hexadecanoic acid, oleic acid, stearic acid, etc., to replace one of the reactive hydrogens of the hexitan with the carboxylic radical. The resultant partial ester is then reacted with ethylene oxide. Commercially available compounds of this type are "Tween 65" and "Tween 81" of The Atlas Powder Company.

Very suitable emulsifiers comprise the organic substituted ammonium salts of sulfodicarboxylic acids that are reacted with various hydrophobic groups such as fatty amides having 12 to 18 carbons to prepare half amides in the manner described in 2,976,209, or with fatty amines having 12 to 26 carbons to prepare half amides in the manner described in 2,976,211, or with polyethoxylated fatty amines in the manner described in 3,080,280, or with fatty acid esters of hydroxyl amines to obtain half amides in the manner described in 2, 976, 208.

Various viscous additives can be added to the aqueous medium to increase its viscosity and thereby serve to enhance or stabilize the foam. These viscous additives are a class of water soluble polymers of natural or synthetic origin which are commonly used as protective colloids. These polymers commonly have molecular weights from 10,000 to 5,000,000 and can be naturally occurring materials, e.g., proteins, alginates, cellulose ethers or entirely synthetic polymers, e.g., polyvinyl alcohol, partially hydrolyzed polyacrylamide, maleic acid or anhydride copolymers, polyvinyl pyrrolidone and copolymers thereof, etc.

Examples of proteinaceous materials include the naturally occurring vegetable and animal proteins having molecular weights from about 34,000 to about 200,000. Examples of such include casein with a molecular weight of from about 12,000 to 98,000; edestin with a molecular weight from about 29,000 to 200,000; hemoglobin having a molecular weight from about 16,000 to 67,000; egg albumin having a molecular weight from about 33,000 to 34,000 or serum albumin having a molecular weight from about 70,000 to 80,000. Other proteins include glutenin obtained from wheat, keratin obtained from animal horn and hoof, etc. Ease of solubility can be attained by partial hydrolysis of the aforementioned proteinaceous materials in accordance with common practice.

The maleic polymers include copolymers and partially hydrolyzed copolymers of maleic anhydride or acid with interpolymerizable vinylidene monomers such as vinyl acetate, vinyl methl ether, ethylene, isobutylene or styrene. These polymers can be prepared by conventional polymerizations and, optionally, can be partially hydrolyzed in an aqueous medium at an elevated pH and temperature for a few minutes to several hours to promote water solubility. Also useful are polyvinylpyrrolidone or copolymers of vinyl pyrrolidone and interpolymerizable vinylidene monomers such as vinyl methyl ether, vinyl acetate, vinyl butyl ether, styrene, etc.

Illustrative of commercially available polyvinylpyrrolidone are type NP, molecular weight of 40,000; K–60 molecular weight of 150,000 and K–90 molecular weight of 300,000.

Another class of suitable viscous additives include the partially hydrolyzed polyacrylamides and copolymers thereof with vinyl monomers such as vinyl acetate, methyl methacrylate, ethyl acrylate, methyl vinyl ether, having from 5 to about 80 percent of the amide groups hydrolyzed to carboxylic acids and water soluble salts thereof, e.g., the alkali metal, ammonium and alkaline earth metal salts such as sodium, lithium, calcium, magnesium, etc. The polyacrylamides are obtained by conventional vinyl polymerization using a free radical initiator to produce a high molecular weight polyacrylamide which can be partially hydrolyzed simultaneously with, or subsequent to its polymerization. The hydrolysis of the polymer can be achieved by prolonged exposure of the polymer to elevated pH and temperature conditions, e.g., treatment of an aqueous solution containing from about 2 to about 15 percent of a polyacrylamide with an aqueous solution of sodium bicarbonate, sodium polyphosphate, trisodium orthophosphate, etc., at a pH of about 8 to 12 and a temperature from about 30° to 100° C. The hydrolysis is performed for a period of from about 2 to about 10 hours and sufficient to effect hydrolysis of from 5 to 8, preferably from about 12 to about 67 percent of the amide groups to carboxylic acid or the aforementioned soluble carboxylate groups.

Other additives that can be used to increase the viscosity of the material include the water soluble polyvinyl alcohol and partially hydrolyzed polyvinyl acetate or copolymers thereof with vinyl monomers such as allyl alcohol, ethyl acrylate, methyl methacrylate, methyl vinyl ether, butyl ether, etc. The polyvinyl alcohol is obtained by hydrolysis of polyvinyl acetate which, in turn, is obtained by the free radical solution bulk of emulsion polymerization of vinyl acetate using a free radical initiator. The polyvinyl acetate is thereafter hydrolyzed by conventional means, e.g., an aqueous solution of the polymer is maintained at an elevated temperature from 50° to 125° C. for a period of from 15 to about 240 minutes, sufficient to hydrolyze the acetate groups. The resultant polyvinyl alcohol is thereafter recovered from the aqueous medium by conventional means, e.g., spray drying.

Other water soluble materials that can be used to enhance the viscosity of the aqueous medium include various water soluble alginates, e.g., sodium alkinate, potassium alginate, etc., as well as various cellulose derivatives such as carboxymethyl cellulose, hydroxyethyl cellulose, etc.

When the viscous additive is used, it is employed in a sufficient concentration to increase the viscosity of water to a level of about 5 to about 200 centipoises measured at 25° C., preferably to a viscosity of about 15 to about 75 centipoises. Of the aforementioned viscous additives, the protenaceous materials are preferred since they exhibit desirable properties upon drying of the foam by maintaining the cellular integrity of the foam even though the water medium is evaporated from the foam.

The gaseous treating agent, alone or in admixture with an inert gas, and the aqueous medium are mixed in suitable volumetric proportions, e.g., from about 3/1 to 40/1, preferably from about 5/1 to about 15/1, and most preferably from about 7/1 to about 12/1, parts gaseous agent per part of liquid volume.

The transpiration of the gaseous agent into the plant can be facilitated and enhanced by inclusion, in the aqueous medium, of various stomata control agents. These stomata control agents include compositions which will stimulate opening of the stomata and thereby facilitate transpiration of the gaseous agent. Such agents include oxalic acid and its alkali metal and ammonium salts, e.g., ammonium oxalate, sodium oxalate, lithium oxalate, potassium oxalate, etc. The oxalate additive can be used at a concentration from about 0.1 to about 10 weight percent of the aqueous medium used in the foam composition, preferably from about 0.5 to about 3 weight percent. Other stomata control agents that can be included comprise the water soluble azides, e.g., the alkali metal and ammonium azides such as sodium azide, potassium azide, lithium acid, ammonium azide, etc., that can be used in concentrations from about 0.01 to about 5.0; preferably from about 0.1 to about 3.0, weight percent of the aqueous medium of the foam composition. The aforementioned azide compound salts tend to inhibit stomata activity and "freeze" the position of the stomata. Consequently, the application of the azide containing foam composition to plants at a time when the stomata are mostly open will result in a high transpiration of the gaseous treating agent into the cellular tissue of the plant over an extended period since the azide will inhibit closing of the stomata.

The foam can be applied to the crop-bearing plants or to the ground surrounding the plants using conventional application equipment such as the standard spray rigs employed for the application of liquid pesticides and defoliants now used extensively in agriculture. In addition, the various aerial applicators used for application of pesticides and defoliants can also be used for the application of the liquid foam of this invention. The equipment can be modified for application of the foam of this invention by providing a gas distributor along the length of the spray boom with means to admix the gaseous treating agent and aqueous spray from the spraying rig at a point immediately upstream of the aqueous spray discharge nozzle at each of the nozzle locations along the length of the spray rig. The nozzles can be modified to provide nozzles having a high pressure drop, i.e., a minimal orifice diameter to intimately admix or thoroughly agitate the mixture of aqueous media and gaseous, treating agent as a discharge from the nozzle and thereby form requisite foam containing the gaseous agent as a discontinuous, phase, trapped by the continuous foam phase.

The application of the foam can be varied, depending on the nature of the crop being treated. The foam can be applied directly to the plant foliage and/or the fruit on the plant and this is the preferred treatment with all plants. With crop-bearing trees such as citrus, deciduous fruits and nuts, application of the foam to the foliage or fruit is far superior to application to the soil. With crop-bearing plants that are small shrubs or vegetables, e.g., strawberries, tomatoes, grapes, etc., the foam can also be applied to the ground surrounding the plant. In this application, the foam slowly releases the gaseous agent to the atmosphere surrounding the plant over an extended period of from 5 to about 300 minutes or longer. The plant can then adsorb the gaseous agent from the atmosphere which has been enriched in the gaseous agent by slow decomposition of the foam. With all plants, however, it is preferred to avoid the intervening atmosphere transfer of the gaseous treating agent by direct application of the foam to the crop-bearing plant.

The method can be applied to any of the various agricultural crop-bearing plants whenever a ripening, desiccation or defoliation, or differentiation (flowering) effect is desired. Examples of suitable plants with which a ripening effect is desirable and which can be treated with the foam in accordance with this invention include fruit-bearing plants such as pineapple, citrus, e.g., lemon, orange, grapefruit, tangerines, etc., deciduous fruit and nut bearing plants such as apples, cherries, prunes, grapes, peaches, nectarines, pears, plums, prunes, almonds, walnuts, etc. Plants with which a ripening of the fruit and, in addition, a defoliation of the plant foliage is useful include the various stem and fruit vegetables such as rhubarb, celery, cucumbers, tomatoes, peppers, peas, beans, etc. The method can also be applied to effect defoliation of various crop-bearing plants such as the root and tuber vegetables, e.g., sweet potatoes, potatoes, peanuts, sugar beets, etc., or agricultural crops such as cotton, sugar cane, seed crops, e.g., alfalfa, Ledino and red clover, milo, rice, etc.

Incidental to the ripening effect that this treatment can have on the aforementioned fruit-bearing crops, the treatmen in many instances also promotes the growth of the abscission layer on the petiole of the fruit so that the fruit can be harvested more easily. This is of particular advantage with the various mechanical harvesting means which are finding increasing acceptance in the agricultural industry.

The treatment can also be applied to hasten maturity by inducing differentiation or flowering of asexual plants. In this application, the foam containing the gaseous treating agent is applied to the plant or to the soil immediately adjacent the plant when the plant is at its incipient flowering state. The treatment is made at dosages sufficient to induce flowering but insufficient to effect defoliation or desiccation. Dosage levels should be from about 0.2 to about 10 pounds of the gaseous treating agent per acre. To some extent, these dosage levels overlap those prescribed for defoliation and desiccation of crop-bearing plants preparatory to harvesting and the different effects of these treatments is partly caused by the different development states of the plant. Thus, young plants at their incipient flowering state are more resistant to defoliation and desiccation than are plants approaching harvesting maturity and treatment of the younger plants with the aforeindicated dosages of the gaseous treating agent can be made without incurring undesired defoliation or desiccation.

Various plants can be treated. In my copending parent application Ser. No. 851,436, there is described a treatment of pineapple. Other crops include strawberries where the treatment to induce flowering can also prevent the subsequent occurrence of albinoism of the fruit, citrus such as oranges, lemons, grapefruit, etc., deciduous fruit-bearing plants such as cherries, apples, grapes, etc., tomatoes, peas, cucumbers, etc.

The foam containing the gaseous agent as a discontinuous phase can be applied to the crop-bearing plants shortly prior to harvesting and at a sufficient dosage to provide a concentration of the gaseous agent on or about the plants from about 1 to about 20 pounds gaseous agent per acre, effective to hasten ripening of the crop. The dosage can be varied somewhat depending on the treatment and the size of the crop bearing plant. Thus, the treatment of tree crops, such as the citrus and deciduous fruit and nut trees obviously requires the application of greater quantities of foam than the treatment of vegetable crops. Regardless of the crop treated, it is preferred that when the application is made onto the plant that it be at a sufficient dosage to cover substantially all of the foliage of the plant.

The application for ripening can be made from about 45 to 5 days, preferably 30 to about 10 days, before the expected harvesting of the crop. Again, the exact timing of the application before the harvesting depends on the nature of the crop treated, however, with most crops, the application within the aforementioned period prior to harvesting will facilitate harvesting by promoting the maturity of the crop by hastening the ripening of the crop, causing greater uniformity of ripeness and/or promoting defoliation of the plant.

EXAMPLE 1

The compositions are employed for hastening the maturity of pineapple (ripening) by their application to pineapple plants bearing fruit of a degree of maturity for an expected harvesting within 30 days. The foam compositions are applied using a portable applicator having a pressure tank of ethylene and a pressure vessel filled with an aqueous solution of 5 weight percent Aerofoam, a commercial foam formula comprising a surfactant and a partially hydrolyzed protein derived from soybean or hoof and horn meal.

The ethylene was used to pressure the liquid vessel. The liquid is discharged through a flow control nozzle and a liquid flow meter into a conventional foaming nozzle. This nozzle, Tee Jet No. 113DU–DI–¼″ has an internal venture nozzle with a 50 mesh screen extending across the venture discharge. The nozzle is modified to connect an ethylene supply line to the gas inlet ports of the venturi and a fan shaped funnel with a 6 inch wide discharge is removably secured to the nozzle discharge.

During the application of the foam, the valves controlling the liquid and ethylene discharge are adjusted to provide relative volumetric flow rates in proportions of 10/1, 15/1 and 20/1 parts ethylene per part of liquid and the liquid flow rate and movement of the applicator through the field are adjusted to provide liquid dosages of 50 and 100 gallons per acre in randomized replicate plots. The effect of an added solute, ammonium nitrate, was also investigated by the incorporation of about 7 weight percent ammonium nitrate in the aqueous solution of the foam formula.

The fruit was inspected for ripeness and rated by the Shell Color Rating standard in the industry. This rating is expressed on a scale of 0–5 wherein the following relationships apply.

| Rating: | Degree of ripeness, percent |
| --- | --- |
| 0–1 | 1–12 |
| 1–2 | 13–37 |
| 2–3 | 38–62 |
| 3–4 | 63–87 |
| 4–5 | 88–100 |

The following table summarizes the results.

TABLE

| Experiment number | Ethylene liquid | G.p.a/ dosage | $NH_4NO_3$, percent | Nozzle discharge | Ripening rating—days after treatment | | | |
| --- | --- | --- | --- | --- | --- | --- | --- | --- |
| | | | | | 7 | 10 | 13 | 15 |
| 1 | [1] saturated | 1,000 | None | Fan | 1.2 | 1.3 | 2.3 | 2.7 |
| 2 | [2] 10/1 | 100 | None | Fan | 1.5 | 1.8 | 2.7 | 3.1 |
| 3 | [2] 15/1 | 100 | 7.2 | Fan | 1.6 | 1.8 | 2.8 | 3.1 |
| 4 | 10/1 | 50 | None | Tip | 1.5 | 1.7 | 2.7 | 2.9 |
| 5 | 15/1 | 50 | None | Tip | 1.9 | 2.1 | 3.1 | 3.5 |
| 6 | 20/1 | 50 | None | Tip | 2.0 | 2.2 | 3.2 | 3.5 |
| 7 | 10/1 | 50 | 7.2 | Tip | 1.6 | 1.7 | 2.6 | 2.8 |
| 8 | 15/1 | 50 | 7.2 | Tip | 1.7 | 1.7 | 2.5 | 2.8 |
| 9 | 20/1 | 50 | 7.2 | Tip | 1.5 | 1.7 | 2.8 | 3.1 |
| 10 | 10/1 | 100 | None | Tip | 1.7 | 1.8 | 2.9 | 3.3 |
| 11 | 15/1 | 100 | None | Tip | 1.3 | 1.4 | 2.5 | 2.8 |
| 12 | 10/1 | 100 | 7.2 | Tip | 1.8 | 1.9 | 2.9 | 3.2 |
| 13 | 15/1 | 100 | 7.2 | Tip | 1.6 | 1.8 | 2.8 | 3.5 |
| 14 | 10/1 | 100 | 7.2 | Fan | 1.5 | 1.6 | 2.7 | 3.0 |
| 15 | 15/1 | 100 | 7.2 | Fan | 1.4 | 1.7 | 2.7 | 3.0 |
| 16 | 10/1 | 100 | None | Fan | 1.9 | 1.9 | 3.0 | 3.2 |
| 17 | 15/1 | 100 | None | Fan | 1.9 | 2.1 | 3.0 | 3.2 |
| 18 | 15/1 | 250 | 7.2 | Fan | 1.1 | 1.3 | 2.1 | 2.3 |
| 19 | 15/1 | 250 | 7.2 | Tip | 1.3 | 1.4 | 2.2 | 2.4 |

[1] Suspension of 0.2 weight percent charcoal saturated with ethylene.
[2] Air, not ethylene, is used as the foaming gas.

The data reveal that all treatments, except the extremely high dosages of experiments 18 and 19, hastened ripening of the fruit to a greater degree than did treatment with the saturated aqueous charcoal suspension (Exp. 1). The presence of the ammonium nitrate retarded this effect only slightly and the application of greater dosages (up to 100 g.p.a.) permitted comparable ripening to that with no ammonium nitrate at the 50 gallon per acre dosage.

EXAMPLE 2

The equipment described in the previous example is used to treat tomato plants bearing green, immature fruit. Before treatment, the plants are inspected and tomatoes of comparable immaturity are tagged. The foam is applied at a liquid rate of 130 gallons per acre with a volumetric ratio of ethylene to liquid of about 40/1. Water and an aqueous solution of about 5.4 weight percent ammonium nitrate are admixed with 5 percent of the Aerofoam formula and the resultant solutions are used in the testing.

The following table summarizes the results.

| | NH₄NO₃, percent | Nozzle | Plant desiccation¹ | Fruit ripening² |
|---|---|---|---|---|
| Experiment: | | | | |
| 1 | None | Fan | 3 | 4.3 |
| 2 | 5.4 | Fan | 4.5 | 3.3 |
| 3 | None | Tip | 2 | 3.3 |
| 4 | 5.4 | Tip | 5 | 2.5 |
| 5 | (³) | | 2 | 2 |

¹ On a scale of 1–10 where 10 represents complete desiccation.
² On a scale of 1–5 where 5 represents complete ripening of all fruit.
³ Untreated.

EXAMPLE 3

The equipment described in Example 1 is used to treat pepper plants to desiccate and defoliate the plants and thereby facilitate their harvesting. The ethylene is admixed with the liquid at a volumetric ratio of about 40/1 and the liquid dosage is about 130 gallons per acre. The following results are obtained.

| | NH₄NO₃ | Plant desiccation |
|---|---|---|
| Experiment: | | |
| 1 | None | 2 |
| 2 | 5.4% (60 lbs./acre) | 6 |
| 3 | Cneck, no treatment | 2 |

In experiments on peppers it has been demonstrated that the following desiccation can be expected by the application of ammonium nitrate containing about 1.0 weight percent of an oil-in-water emulsifier.

| | NH₄NO₃, lbs./acre | Plant desiccation |
|---|---|---|
| Experiment: | | |
| 4 | 60 | 2 |
| 5 | 120 | 6 |
| 6 | 240 | 10 |

A comparison of the results indicate that the use of the foam containing ethylene as the discontinuous phase enhanced the desiccation to a value equal to that obtainable, in the absence of ethylene, only at twice the dosage of ammonium nitrate.

The preceding data, therefore, evidence that ethylene serves to intensify the desiccation effect of ammonium nitrate.

The specific modes of practice illustrated by preceding examples are intended solely to illustrate application of the invention and to demonstrate results obtainable therewith. It is not intended that these examples be unduly limiting of the invention, but rather that other reagents and plants as well as method steps described herein and their obvious equivalents be included in the scope of the invention.

I claim:

1. A method for facilitating the harvesting of a field of crop-bearing plants that comprises treating, at a time from 5 to about 45 days prior to the expected time of harvesting, said crop-bearing plants with carbon monoxide or an unsaturated hydrocarbon having from 2 to about 4 carbons in an amount effective to hasten the maturity of the crop-bearing plant by application to said plant or to the soil adjacent said plant of an aqueous foam having a discontinuous gas phase comprising carbon monoxide or an unsaturated hydrocarbon having from 2 to about 4 carbons and a continuous aqueous phase with proportions of 3 to about 40 volumes gas phase per volume aqueous phase, said aqueous phase containing an additive selected from the class consisting of surface active agents and a protective colloid comprising a water soluble polymer and mixtures thereof in an amount sufficient to maintain said foam for a period of from 5 to about 300 minutes.

2. The method of claim 1 wherein said unsaturated hydrocarbon is ethylene.

3. The method of claim 1 wherein said unsaturated hydrocarbon is acetylene.

4. The method of claim 2 wherein said aqueous phase contains a surface active agent sufficient to decrease the surface tension of the aqueous phase to about 15 to 50 dynes per centimeter.

5. The method of claim 2 wherein said aqueous phase contains a water soluble polymer at a concentartion effective to increase the viscosity of the aqueous phase to about 5 to 200 centipoises.

6. The method of claim 2 as applied to fruit-bearing plants with a sufficient quantity of said unsaturated hydrocarbon to effect ripening of said fruit.

7. The method of claim 2 as applied to crop-bearing plants with a sufficient quantity of said unsaturated hydrocarbon to effect defoliation of the plant.

8. The method of claim 5 wherein said viscosity additive comprises a protein having a molecular weight from 34,000 to 200,000.

9. The method of claim 2 wherein said foam is formed by an admixture of ethylene and an aqueous liquid in proportions of from 5 to 15 parts by volume of ethylene per part by volume of said liquid.

10. The method of claim 1 wherein said gas phase is employed in amounts from 5 to about 15 parts by volume per volume of said liquid.

11. The method of claim 6 wherein plants bearing immature pineapples are treated with said foam to hasten the ripening of said pineapples.

12. The method of claim 6 wherein plants bearing immature tomatoes are treated with said foam to hasten the ripening of said tomatoes.

References Cited

UNITED STATES PATENTS

| 2,242,429 | 5/1941 | Johnson | 71—127 |
| 3,689,245 | 9/1972 | Weidman et al. | 71—67 |
| 3,692,512 | 9/1972 | Sachnik | 71—65 |
| 2,245,867 | 6/1941 | Mehrlich | 71—Dig. 1 |

FOREIGN PATENTS

| 486,113 | 5/1938 | Great Britain | 71—Dig. 1 |
| 971,630 | 9/1964 | Great Britain | 71—Dig. 1 |

OTHER REFERENCES

Chem. Eng. News, Feb. 3, 1969, p. 35.
Sachnik: 22nd Annual So. Weed Sci. Proceedings, 1969, pp. 392–396.

JAMES O. THOMAS, Jr., Primary Examiner

U.S. Cl. X.R.

71—65, 127, Dig. 1